(12) United States Patent
Schemm et al.

(10) Patent No.: US 7,958,830 B2
(45) Date of Patent: Jun. 14, 2011

(54) CONTACTLESS ENERGY SUPPLY FOR MOVING CONSUMERS

(75) Inventors: Eberhard Schemm, Lohr am Main (DE); Bernd Schnurr, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 1019 days.

(21) Appl. No.: 10/565,460

(22) PCT Filed: Jun. 17, 2004

(86) PCT No.: PCT/EP2004/006508
§ 371 (c)(1),
(2), (4) Date: Apr. 5, 2007

(87) PCT Pub. No.: WO2005/021317
PCT Pub. Date: Mar. 10, 2005

(65) Prior Publication Data
US 2007/0289476 A1 Dec. 20, 2007

(30) Foreign Application Priority Data
Jul. 29, 2003 (DE) .................................. 103 34 737

(51) Int. Cl.
*B60L 13/00* (2006.01)
(52) U.S. Cl. ........................................ 104/290; 104/292
(58) Field of Classification Search .................. 104/290, 104/292, 281–284; 310/12
See application file for complete search history.

(56) References Cited

U.S. PATENT DOCUMENTS

| | | | | |
|---|---|---|---|---|
| 5,497,038 A * | 3/1996 | Sink | | 310/12 |
| 6,021,499 A * | 2/2000 | Aleshi | | 713/300 |
| 6,095,054 A * | 8/2000 | Kawano et al. | | 104/139 |
| 6,411,049 B1 * | 6/2002 | Fischperer | | 318/38 |
| 6,502,517 B1 * | 1/2003 | Groening et al. | | 104/281 |
| 6,578,495 B1 * | 6/2003 | Yitts et al. | | 104/292 |
| 6,580,185 B2 * | 6/2003 | Kang et al. | | 310/12 |
| 6,591,756 B2 * | 7/2003 | Mayer et al. | | 104/290 |
| 6,899,036 B2 * | 5/2005 | Lamb et al. | | 104/290 |
| 7,040,481 B1 * | 5/2006 | Sommerhalter et al. | | 198/619 |
| 7,126,308 B2 * | 10/2006 | Shigeta et al. | | 318/802 |
| 7,204,192 B2 * | 4/2007 | Lamb et al. | | 104/282 |
| 7,394,298 B2 * | 7/2008 | Hazucha et al. | | 327/108 |
| 2002/0172056 A1 * | 11/2002 | Riggio et al. | | 363/24 |
| 2005/0061195 A1 * | 3/2005 | Lutz et al. | | 104/290 |
| 2006/0236890 A1 * | 10/2006 | Lamb et al. | | 104/282 |
| 2007/0057898 A1 * | 3/2007 | Nakajima et al. | | 345/100 |
| 2007/0289476 A1 * | 12/2007 | Schemm et al. | | 104/290 |
| 2008/0303355 A1 * | 12/2008 | Fiske et al. | | 310/12 |

FOREIGN PATENT DOCUMENTS

| | | | |
|---|---|---|---|
| DE | 41 26 454 | | 2/1993 |
| EP | 580107 A1 * | | 1/1994 |
| EP | 0 580 107 | | 9/1997 |
| WO | WO 9302888 A1 * | | 2/1993 |

* cited by examiner

*Primary Examiner* — S. Joseph Morano
*Assistant Examiner* — Jason C Smith
(74) *Attorney, Agent, or Firm* — Kenyon & Kenyon LLP

(57) ABSTRACT

A contactless energy supply for electrical consumers mounted on the mobile part of a linear motor is provided, the energy supply being provided without additional voltage sources. A higher frequency energy supply field is superposed over the propulsion field, the energy supply field being inductively decoupled using the energy transmitting interface of the secondary part, and supplying consumers mounted on the secondary part with energy.

12 Claims, 5 Drawing Sheets

CONTACTLESS ENERGY SUPPLY FOR MOVING CONSUMERS

FIELD OF THE INVENTION

The present invention relates to supplying electrical loads (or consumers) on the secondary part (moving part) of a linear motor.

BACKGROUND INFORMATION

European Patent document EP 0580 107 shows a magnetic suspension system which is designed for transport purposes using straight and curved path sections. The crucial point, in this instance, is the control of the air gap, as a function of the load of the secondary part, using a regulating device fixed to the secondary part. This regulation device is supplied with energy in a contactless manner, via an induction loop having a 10 kHz voltage source. The induction loop is, however, only present at the straight route sections. For travel on curves, a back-up battery situated on the suspension vehicle has to provide energy. Disadvantages of the system are that, on the one hand, the inductive energy coupling is not without gaps along the route, and, on the other hand, for the generation of an alternating field of high frequency, generally an additional expenditure for material, manufacturing and costs for the implementation is required, which increases in proportion to the route length, and therewith makes the components more expensive in an extreme manner (see, e.g., FIG. 6; column 11, lines 14 ff), as well as requiring regular maintenance.

U.S. Pat. No. 6,502,517 also shows a magnetic suspension system. Contactless energy transmission is also made the subject of discussion in this instance. However, a specific point of departure as to how this energy transmission could be implemented is hardly to be found here (see, e.g., FIG. 1, column 5, lines 19 ff and claims). It may also be clearly inferred from this document that the magnetic field for locomotion (reference points 8, 8.1 and 8.2, FIG. 1) and the device for energy transmission (reference point 9, FIG. 1) are constructed mechanically separated from each other. Consequently, similar disadvantages derive from this U.S. patent document as in the case of the arrangement described in European patent document EP 0580 107.

It is an object of the present invention to provide a contactless energy supply for electrical consumers applied to the moving part (secondary part) of a linear motor, without considerable additional material and/or manufacturing expenditure, and without additional voltage sources on the secondary part. Besides all this, the equipment should be largely not susceptible to faults.

SUMMARY

This object is attained by the present invention which ensures a contactless energy transmission that satisfies all the points required, and especially ensures the required maintenance friendliness, since hardly any additional mechanical system is involved. Because of the induced voltage of an additional energy supply field in the field-generating coils used for generating the propulsion field (traveling field), and the utilization of a linear motor component (primary part) that is pre-existing, and that is connected therewith, this arrangement saves the additional material expenditure and manufacturing and assembly costs. The secondary part and the primary part of the linear motor do not have to be enlarged by mechanical components (inductance loops, auxiliary windings, etc.), in the design approach according to the present invention. Only an additional energy transmitting interface is required. Also, an expansion, from a circuit technology point of view, of the coil feeding for the induction of the required electrical field required for the energy transmission into the field-generating windings has to be undertaken. However, these measures result in relatively low costs.

The consumers may be functional blocks for propulsion regulation and motion regulation, as well as data processing devices for position recording and the sensors connected with that, and/or means for communications. This makes the device very flexible overall, with respect to the conceivable fields of use. A plurality of embodiments are conceivable and implementable, from complex transportation, packaging and automation devices having a plurality of independently driven secondary parts all the way to the implementation of a simple linear motion.

Even process energy could be transmitted in a contactless manner to the secondary part, using this method. In this context, the term process energy should be understood to mean energy which is not needed for supplying drive-relevant consumers, but for carrying out a procedure within a process. This could be, for example, the welding of a foil for foodstuffs after filling it up on a packaging machine. Any number of other types of application are conceivable. For application in industrial machines, it is therefore proposed that at least one consumer on the secondary part is a fixture relevant to the process, that takes over a manufacturing step or a processing step within an industrial process.

For purposes of modularization and expandability of a route built up from the linear motor according to the present invention, it would be advantageous to design the motor in such a way that it is driven in a monophase or multiphase manner and that it has a propulsion regulation or a motion regulation, particularly for modular transport devices having straight and curve-shaped route sections, which form a route sequence having at least one secondary part, communicating via an information transmitting interface, which contains a part of the drive, the secondary part having at least one permanent magnet and a signal processing device, having propulsion regulators and motion regulators, and which generates at least one setpoint value relevant to a coil controller, the setpoint value being supplied via a setpoint interface from the secondary part to a coil controller that is stationary with respect to the primary part, as the value used for the commutation, and means for the rigid support of the secondary part are provided which guide the secondary part along the predetermined route.

The energy supply according to the present invention, in such a case, feeds the signal processing device, that is situated on the secondary part pertaining to the apparatus, having motion or propulsion regulators. The coil is mounted in a stationary manner, for instance, on the primary part, and generates the propulsion field for the secondary part.

The signal processing device calculates controlled variables, from actual values received via sensors and/or interfaces, such as a current or voltage setpoint value. Such a setpoint value could, in turn, be used as input variable of the stationary coil controller, and could be transmitted via a setpoint value interface to receiving coils of the coil controller, in a contactless manner. The setpoint specifications for the coil controller thus occur directly and without cable connection via the moving secondary part, a function of, among other things, its instantaneous position. The motion regulation or propulsion regulation could also be a part of the regulation. A position setpoint value or a speed setpoint value, or the like, would be able to be produced by a centralized or decentralized control, and could be transmitted to the secondary part via wireless interfaces, inductively, for example. It would thereby be possible to supply only those field-generating coils with propulsion energy which are located in immediate proximity to the secondary part, and which have to be supplied with current for the latter's next motion step. The basic assumptions for a universal system are created by this design approach, and this system offers a design approach for approximately every transportation problem or processing problem in industrial machines, by the ability to implement modularly constructed route sections of any shape, almost like a construction kit.

It would further be useful to have an arrangement of the form that, on the secondary part there is situated at least one AC/DC converter for the voltage conversion and supply of consumers. The AC/DC converter is used in this case to convert the alternating voltage fed in via the energy interface into a direct voltage, since the users are supplied with a direct voltage, as a rule. Provided all the consumers require an identical supply, they could be connected to the supply via an energy supply bus, which enormously reduces the expenditure for circuit technology and reduces the probability of failure.

If the consumers are connected to the energy transmission interface via DC/DC converters, they could be operated at different supply voltages. In spite of a single energy transmitting interface, it is thereby possible to implement supply voltages of the most different levels. The DC/DC converter, which only changes the voltage level to the desired value, in this case would be preconnected to a consumer, or could be integrated into the consumer.

In order to be able to influence the height of the required voltage directly at the source of creation, without additional hardware, it is provided to position at least one AC/AC converter on the secondary part for voltage conversion and the supply of the consumers. In this case, too, different supply voltages are able to be implemented for different consumers in that the consumers are connected to the energy transmitting interface via integrated or separate AC/DC converters. Using this procedure, the object of an AC/AC converter would simply be adapting the feed level already at the source.

Additional interconnection configurations of AC/DC and/or AC/AC converters for producing different voltage levels and voltage types on the secondary part are conceivable and come about from the plurality of combination possibilities. Here, for the sake of simplicity, we shall do without representing every possible combination.

Particularly energy saving operation type is an operation type in which only those windings of the primary part generate an energy supply field which essentially lie opposite the secondary part. Because of this, an energy supply field is generated only via field-energizing coils in whose direct vicinity the energy transmitting interface of the secondary part is located. Additional energy saving measures would come about in that exclusively in each case those windings of the primary part generate an energy supply field which essentially lie opposite the energy transmitting interface of the secondary part. An ulterior motive in this design approach is the use of this feature in a system initialization. This is used to detect the initial configuration, that is, among other things, to detect the position of the secondary parts on the path of motion.

The arbitrary supplying with current of all coils increases the heat or energy losses, and thereby also reduces the durability and the service life. A targeted activation of the respective windings may be implemented via position recording, and the known dimensions or the mounting location of the energy transmitting interface on the secondary part, for instance, via a central control or via the distributed control logic.

If the system is designed in such a way that all windings supply energy upon initialization of secondary parts, an initial recording of the position of the secondary parts, for instance, when switching on the system or after a system interference such as a collision, is able to be made without increased expenditure on circuit technology, and, above all, without cable connection. In this case, at the power-up instant, all secondary parts are supplied with energy, independent of their location within their propulsion path, and all the coils are supplied with current. Without these measures, no data with respect to the location of the secondary parts would be available in the case of a central control after the (re)starting of the system, because for lack of present energy, the systems mounted on the secondary part do not work yet. An additional current supply would then be required (batteries, accumulators, etc.) which in the exemplary case mentioned takes over the current supply and/or perhaps buffers memories for maintaining position data. In the case of a collision or a derailment of the secondary part, however, protection of these data could also be useless. The usual method for the solution of this problem is the so-called "homing" method, in which, first of all, all secondary parts have to travel through a specified route section for identification and recording of position. Only then is the system again ready for use, and the secondary parts can again arrive at their original position, which is a time-consuming procedure, and, with regard to the effects of downtime in highly optimized manufacturing processes, a very expensive one. Besides that, the provided solution is an additional step in the direction of freedom from maintenance, because of the absent additional current sources. The absent additional current sources also reduce the weight of the equipment and improve its dynamics.

It would be useful if the linear motor were further characterized in that, during normal operation, accumulators and/or batteries and/or solar cells that are buffered via the energy interface would ensure the required energy supply. Then the secondary parts themselves would receive their position data in the currentless state, and a short-term operational interruption, in which the secondary parts maintain their original position would be at least without influence on the position detection of the control.

The present invention further addresses the object of creating the basis for an industrial machine, particularly for use in automation paths which includes an industrial process, for instance, for flat stock, packaging and tools, the process including a linear motion which a linear motor, which is outfitted with at least one secondary part, supplied via an energy transmitting interface, on which consumers are situated, and with at least one primary part having field-generating coils, that are strung together along a predetermined route, for the propulsion of the secondary part via a propulsion field, and is characterized in that an energy supply field of higher frequency is superposed on the propulsion field, which is inductively coupled in via the energy transmitting interface of the secondary part, and supplies energy to consumers mounted on the secondary part. The advantages of an industrial machine according to the present invention are particularly efficiently utilized if the machine includes a plurality of secondary parts which execute a motion synchronous with the process according to predetermined process rules. A plurality of secondary parts cause increased complexity in the energy supply. This allows the number of secondary parts to be freely determined, and, depending on the process, it is limited solely by the requirements of the process, by the geometry of the secondary parts and by the routing of the primary part.

DETAILED DESCRIPTION

Figure 1:
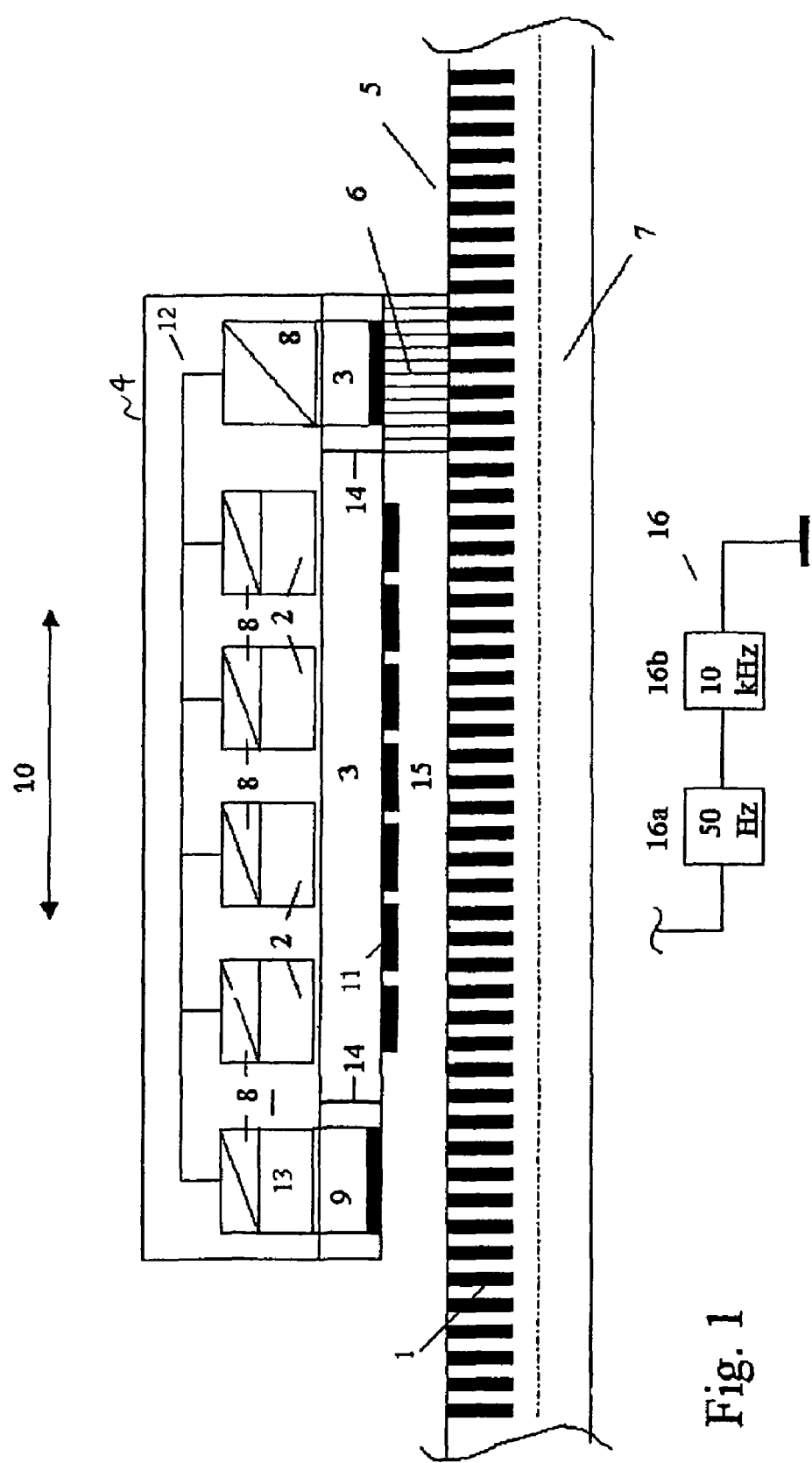
FIG. 1 shows schematically the cross section of a linear motor according to the present invention.

The linear motor shown in FIG. 1 is made up of a secondary part/secondary parts 4 (only one shown here for clarity sake) and a primary part/primary parts 5, which form a motion path (only one segment shown here for clarity sake). The overall arrangement is shown in a cross-section which is parallel to the possible direction of motion 10 along the center axis. Permanent magnets 11 are situated on the lower side of secondary part 4, which is opposite primary part 5. The field of this permanent magnet 11 interacts with the propulsion field or moving field of field-generating coils 1 and secondary part 4, because of the resulting Lorentz force. On the upper side of secondary part 4, consumers 2 are situated which are supplied with energy using voltage and/or level converter 8. In this example, energy supply interface 3 is docked to the secondary part on a side 14 that extends transversely to the direction of motion. Energy interface 3 could in principle be mounted at any other place on secondary part 4, and when the mounting location is selected, it is only important that a good to optimal coupling factor is achieved. It would also be conceivable to position the interface in the middle of secondary part 4, or between permanent magnets 11. Converter 8, situated over energy supply interface 3 is directly connected to the output of interface 3, and it, in turn, makes available a connection for all consumers 2 that travel along. The energy is taken up via energy supply field 6, which is indicated in air gap 15 between energy supply interface 3 and primary part 5. Now, if the secondary part moves according to motion direction 10 that is shown, energy interface 3 is guided along. The result is that energy supply field 6 has to follow the motion, otherwise the energy supply would break down.

Figure 2:
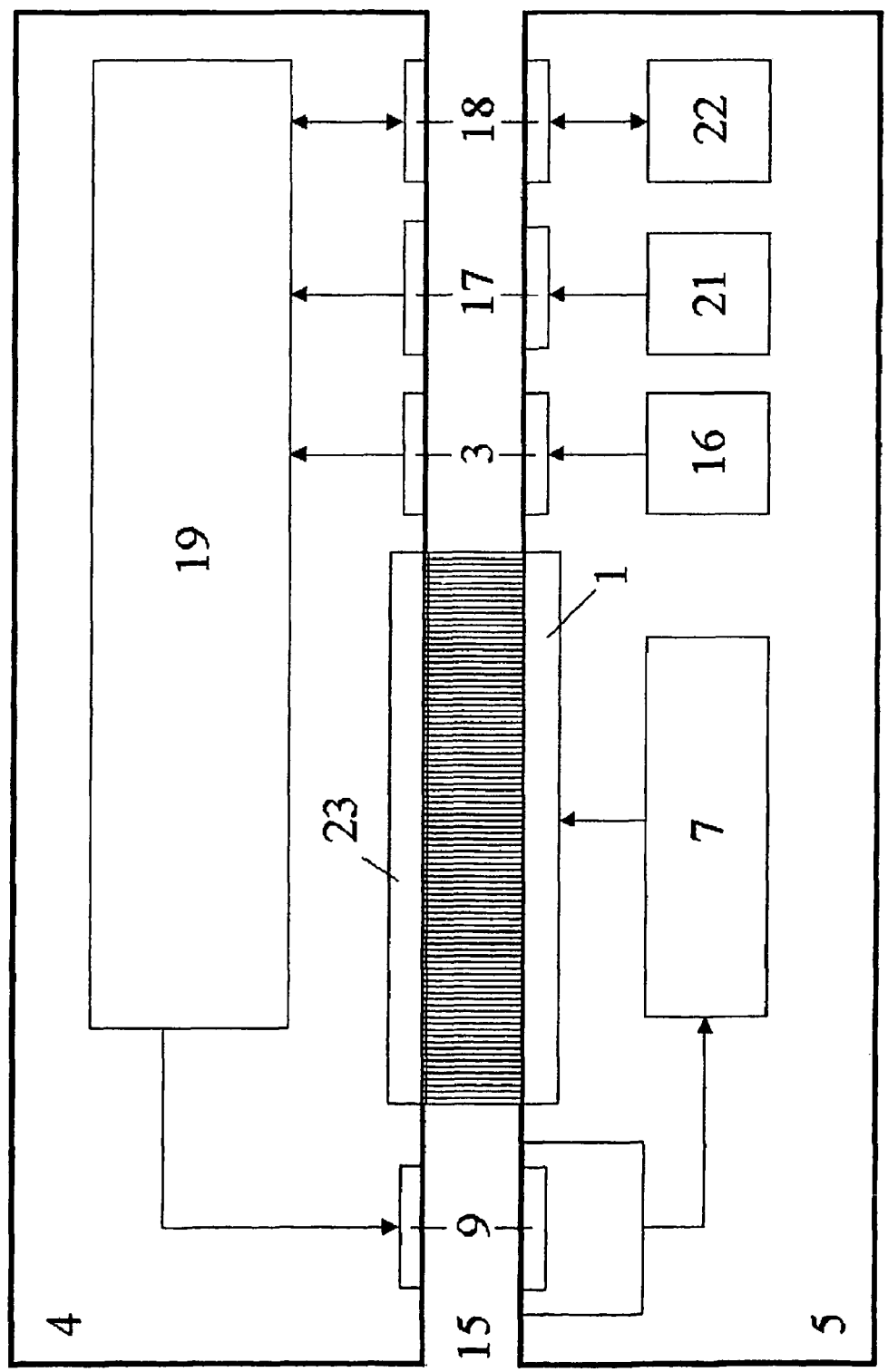
FIG. 2 shows schematically a linear motor having additional interfaces for communication with a superordinated control, for use in industrial machines.

However, this problem may be solved via a position detecting system and an additional communications interface, for instance, to a centrally or decentrally organized sequencing control, as shown in FIG. 2. A setpoint value interface 9 having a postconnected signal processing 13 is used for the propulsion regulation or motion regulation. Setpoint value interface 9, same as the energy interface, is docked to a side 14 that runs transversely to the direction of motion. Via a receiving interface that is not shown, via this interface, data could be transmitted using a superordinated control or the coil controller. Each individual winding of field-generating coil 1 is supplied with current via coil controller 7 that may possibly be integrated in primary part 5, and accordingly may be activated individually. A part of the coil controller is signal sources 16 for generating the propulsion transmission field or energy transmission field. These might be implemented integrated into the primary part, but also externally. The equipment is also functional without setpoint value interface 9 having postconnected signal processing. An external control then has to take over the control of field generating coil 1.

The energy supply field superposed on the propulsion field could be generated in that, in order to produce an AC voltage 16a, required for the propulsion field, having a frequency such as 50 Hz (although other frequency is conceivable), an additional AC voltage source 16b having 10 kHz or even a variable frequency is connected to the system in such a way that, from the superposition of the two voltages, the desired effect sets in and the two fields are superposed on one another. The receiver resonant circuit at secondary part 4 is tuned to the frequency that is to be decoupled, so that it couples the maximum possible energy. Voltage and level converter 8 adjusts the output voltage to the demands of consumers 2, which are connected to it via line 12. It would also be conceivable to assign a unique frequency to each secondary part, in order then to activate it via this assigned frequency. Additional modulation methods for the activation of the secondary parts are also conceivable.

If one or more the consumers 2 are selected in such a way that they take over tasks within an industrial process, for instance, a welding or an adhesion procedure, these consumers 2, same as all the other consumers 2, could be supplied with current via energy supply interface 3 and possibly an additional, parallel connected voltage and/or level converter 8 (not shown here).

Depending on how the voltage and/or level converter 8 is selected, different requirements may be satisfied. Both consumers having alternating voltage connection and DC voltage connection are able to be supplied with current by the combination of AC/DC, AC/AC and DC/DC converters 8. It is possible to adjust the voltage level picked off at energy supply interface 3 to consumers 2, via integrated voltage dividers. It is also conceivable that each consumer 2 has its own converter 8, which ensures the individual, consumer-specific voltages and levels.

Energy supply interface 3 rides along on secondary part 4, along route 10. A non-stationary, traveling energy supply field 6, that rides along, for example, is used which follows the motion of the secondary part with respect to its speed specifications or acceleration specifications by the control. Only those field-generating coils 1 guide energy to the energy supply which are, in fact, situated under secondary part 4 or perhaps even under energy supply interface 3. The advantage, as mentioned before, lies in the reduced energy usage and in the reduced heat losses. In the case of system initialization, it is meaningful to supply all field-generating coils 1, simultaneously or section by section, with energy, in order to supply immediately with current all consumers 2, traveling along, without a separate position detecting mechanism, and to be able to scan the required data by a control. In principle, however, the spatial extension of energy supply field 6 may also be implemented in a different way. It could be permanently present on the entire route, even in normal operation, or only on relevant path sections, dependent on the instantaneous position of secondary part(s) 4 that is/are to be fed. Naturally, in the latter case, greater demands are made on the control of the field-generating components.

A single one or several of consumers 2 could also be designed as energy stores (accumulators), so that after the loading process, in the case of an energy failure, they could supply the other consumers connected via line 12. Other energy sources that supply energy to line 12 are also conceivable (batteries, solar cells, etc.).

The linear motor shown in FIG. 2 is made up of secondary part(s) 4 and primary part(s) 5. The illustration shows only a single secondary part 4 in a sectional view, for reasons of clarity. Primary part 5 forms a route, as in FIG. 1, traveled by a plurality of secondary components 4 simultaneously. On secondary part 4 there is situated a signal processing device 19 for motion regulation and propulsion regulation, and it travels along in response to motion. This device 19 is also connected to energy transmitting interface 3, to sensor interface 17 and to control interface 18, and additionally to setpoint interface 9. On primary part 5 there is a coil controller 7 which is connected to the field-generating windings 1 and to setpoint interface 9.

Also on primary part 5 there is an energy transmitting interface 3, a sensor interface 17 and a control interface 18. These are connected to a signal source 16, a motion state sensor 21 and a control connection 22. In air gap 15, the propulsion field between field-generating components 23 of secondary part 4 and field-generating coils 1 of primary part 5 are indicated. Field-generating components 23 are situated on the lower side of secondary part 4, and ride along with it.

Control connection 22 ensures the connection to a centrally or decentrally situated control (not shown here), which puts into place the coordination of the motion sequence or an entire industrial process. Control data are transmitted in a contactless manner to corresponding control interface 18, of secondary part 4, that lies opposite, and this is done via control interface 18 on the primary part, which in this specific example could be designed as an inductive, bi-directional interface. Control interface 18 of the secondary part supplies data to signal processing device 19, and the latter evaluates the data. A motion state sensor 21 supplies position data to signal processing device 19, via an additional contactless sensor interface 17. Signal processing device 19 uses these data to record the current position of assigned secondary part 4 relative to primary part 5. Signal source 16 situated on primary part 5, also in a contactless manner, supplies signal processing device 19 on secondary part 4 with electrical current via energy transmission interface 3. The control of field-generating controls 1 is taken over by coil controller 7, which receives specifications with regard to the required field strength via setpoint value interface 9. In this case, the setpoint value could be a current setpoint value which is directly proportional to the intensity of the magnetic field, and with that, to the acceleration of the secondary part. A voltage setpoint value would also be conceivable. The current setpoint value is supplied, via the contactless interface, to setpoint value interface 9 directly by signal processing device 19 of secondary part 4. Signal processing device 19 derives this setpoint value directly from the data it receives from sensor interface 17 and control interface 18. In the case of the data from control interface 18, a position setpoint value could be involved, from which signal processing device 19 calculates the required acceleration and speed as a function of the path to be covered, and then requests the necessary traveling field strength per current setpoint value. Depending on the case of application, other kinds of setpoint values are also conceivable.

A combination of the devices shown in FIG. 1 and FIG. 2, for example, is optimally suitable for use in industrial machines. Consumers having different performance demands may be applied on the secondary part, and supplied there, because of the explained combination of AC/DC, AC/AC and DC/DC converters. The design approaches are particularly suitable for automation paths which include an industrial process, or for manufacturing and processing of flat stock, packaging and tools, the process including a linear motion which is executed by a monophase-controlled or multiphase-controlled linear motor having motion control that has at least one secondary part 4 and at least one primary part 5 having field-generating coils 1 in concentrated or overlapping winding along a predetermined route. The compact design and transferring of the control intelligence to secondary part 4 make possible the manufacturing of very flexible, modular-type components, which may be offered in the form of an assembly kit. The path sections developed from primary parts 5 may theoretically be manufactured in any shape, that is, as straight or curve-shaped sections having right-hand or left-hand curve directions, or as sections for bridging a rise, and they thus make possible the design approach to almost any transportation problem.

Figure 3:
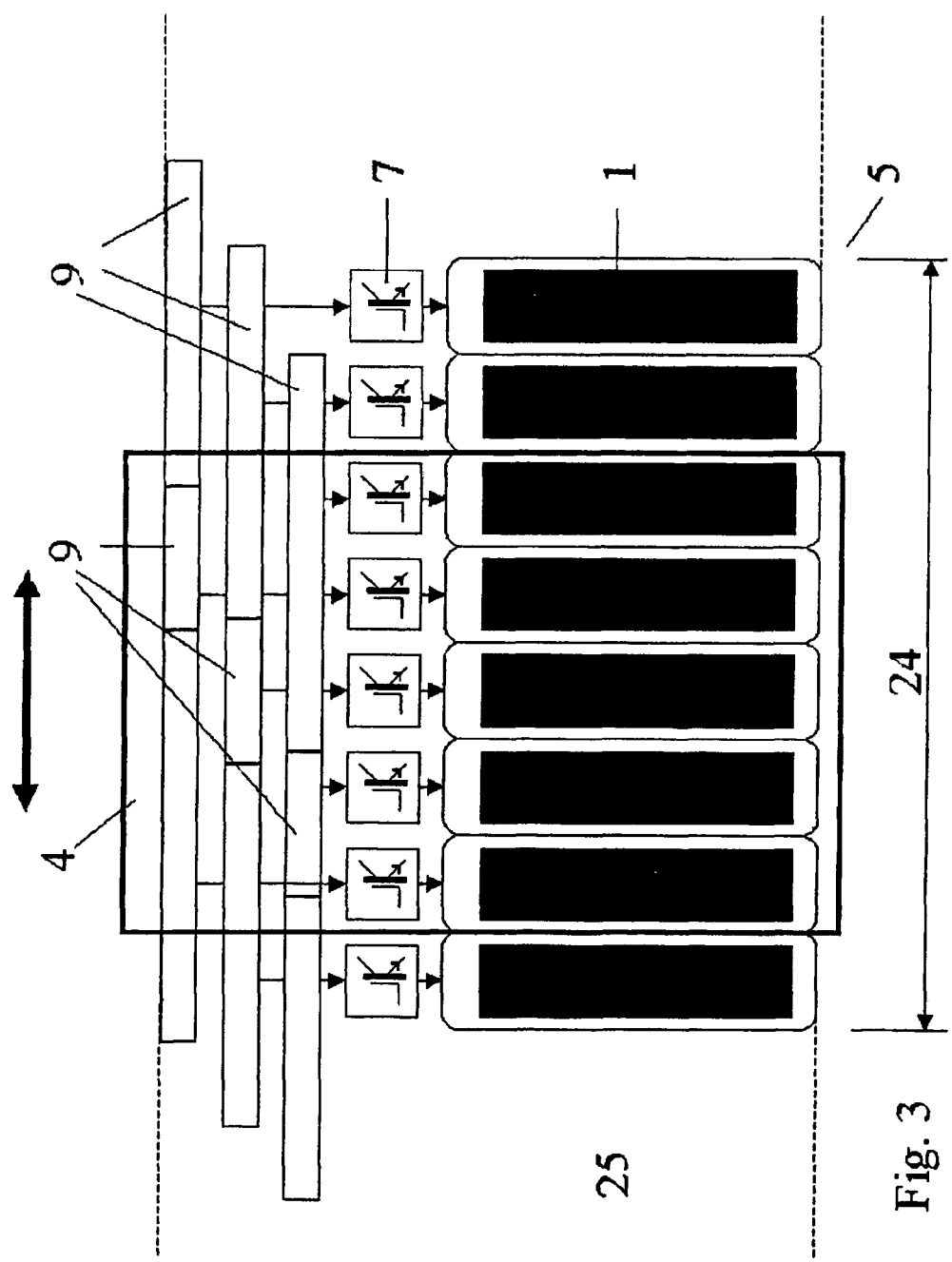
FIG. 3 shows a top view of the arrangement shown in FIG. 2.

FIG. 3 shows a top view of a path 25 formed of primary parts using three-phase activated coils. For reasons of clarity, again only one secondary part 4 and one route section 24 are illustrated. This secondary part 4 is able to move above route 25 along the bidirectional arrow drawn in the forwards or backwards direction. Rigid support of the secondary part could be performed, for example, by rolls and rails, but a magnetic suspension system would also be conceivable. The transmission of the setpoint value from the signal processing device via setpoint value interface 9 of the secondary part and the primary part takes place here for each of the three phases via a separate interface, and therefore three setpoint value interfaces 9 lie next to one another on secondary part 4, but they are drawn in offset to one another in the direction of motion. Each of the three setpoint value interfaces 9, designed in a segmented fashion, of primary part 5 activates a group of windings 1 in parallel via the corresponding setpoint value interface of primary part 5, whereby a co-phasal supply with current is ensured. In this context, it is important to know that only those coils are supplied with current which are actually required for driving secondary part 4. This means those windings which just happen to be under or directly in front of secondary part 4. This principle of coil activation as a function of the secondary part position, among other things, effectively limits the power loss of the transportation system. In a three-phase system, as shown in FIG. 3, every third coil is supplied with current of identical phase position via its own coil controller 7. Coil controller 7 is here indicated only by a transistor symbol. In response to the motion of the secondary part along route 25, setpoint value interfaces 9, situated at the lower side of the secondary part, travel along the route and thereby pass their corresponding interfaces on the primary part. This leads to the commutations, already mentioned, of the coil current, corresponding to the motion sequence. If setpoint value interfaces 9 of secondary part 4 leaves the detection range of the interface on primary part 5, this leads to the switching off of the current in the affected coils. If the apparatus reaches a new interface, this leads to activation of the coil current, which then drives the secondary part in the desired direction. There is the additionally the possibility of influencing the propulsion via the setpoint value transmitted to coil controller 7, for instance, a speed increase due to acceleration as a function of a load, or a prespecification of a central control device.

Figure 4:
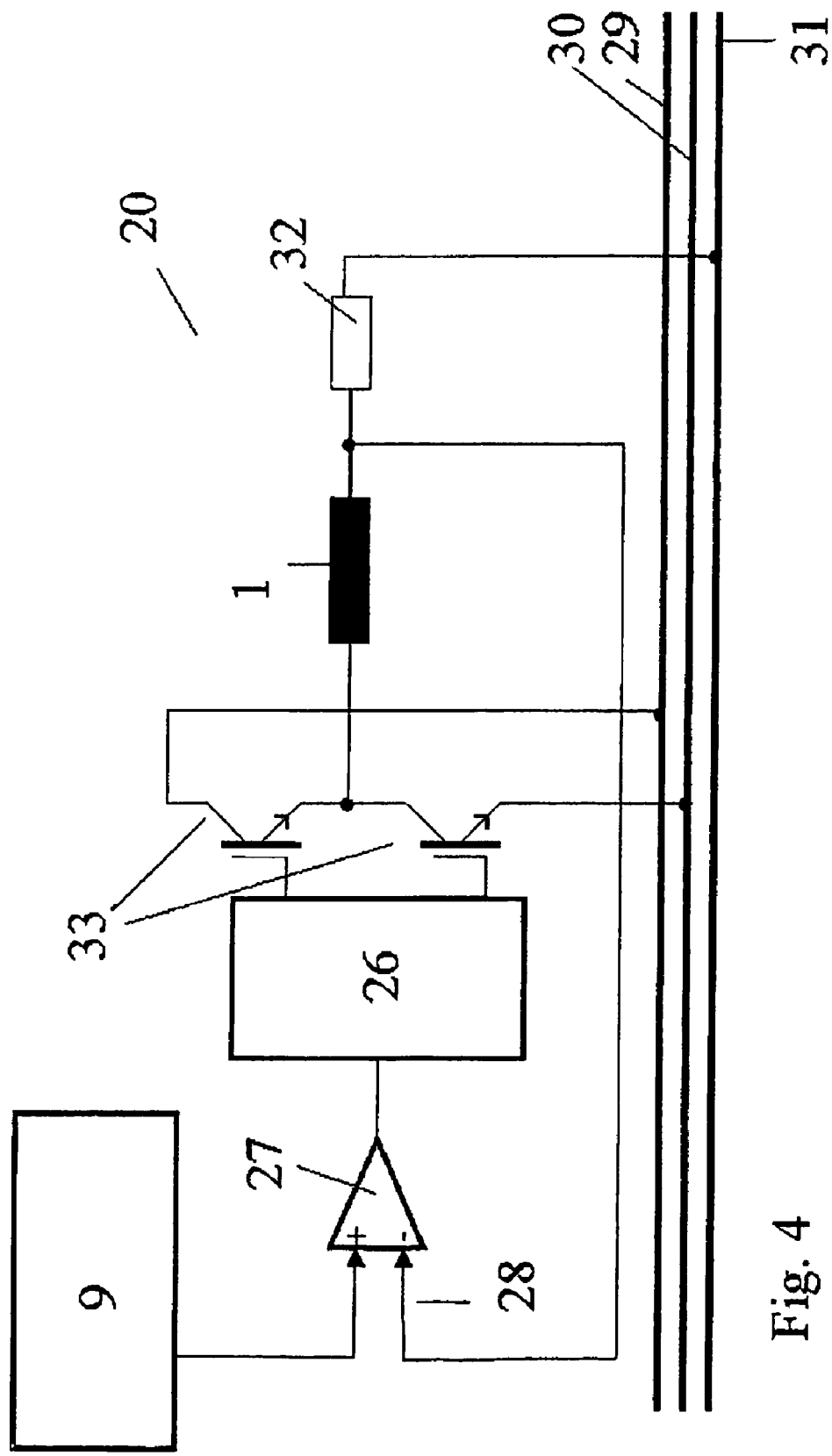
FIG. 4 shows schematically an example implementation of the coil drive circuit.

FIG. 4 shows a schematic circuit diagram of a coil controller 20. A current setpoint value received from setpoint value interfaces 9 for activating the coils is compared to the instantaneous actual current value 28 of the coils. This actual value is directly ascertained via a measuring device 32. The result of this comparison is conducted to a pulse width modulator 26, which activates a field-generating coil via two IGBT's connected as a half bridge 33. Thus coil controller 20, in this example, is made up of a comparator 27, pulse width modulator (PWM) 26, half bridge 33 and a measuring device 32. Additional components may also become necessary, depending on the respective objective to be attained. Coil controller 20 receives the input signals from setpoint value interface 9 and from actual value feedback 28. The output signal is used directly for supplying the field-generating coils 1. In this connection, a bipolar voltage supply is used as the supply voltage of the device, which is indicated by line feeds 29 and 30. The measurement of the actual current value is made relative to ground 31. It is conceivable to have additional forms of embodiment for controlling the coils.

Figure 5:
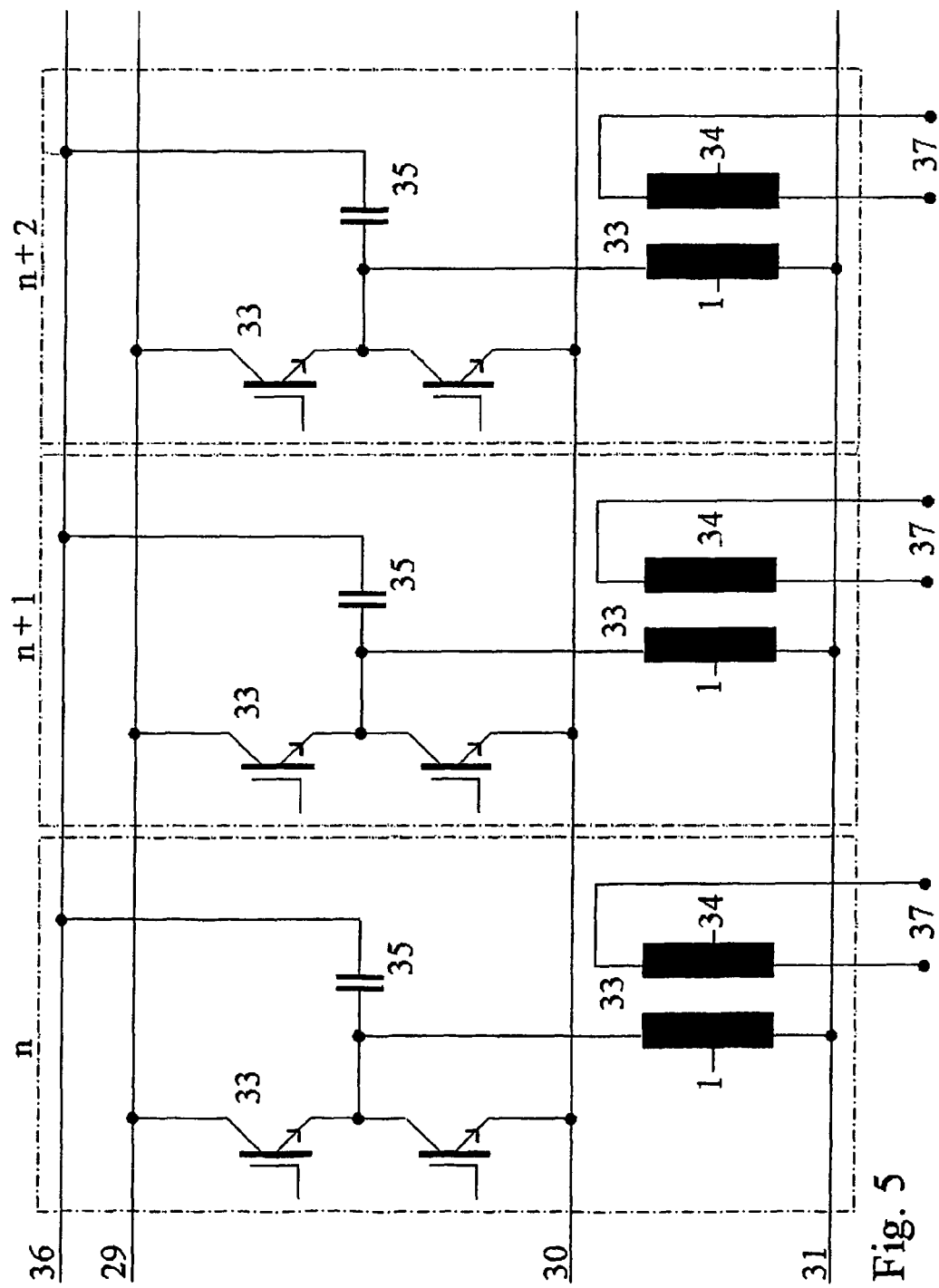
FIG. 5 shows a schematic circuit diagram of an example implementation of power coupling and power decoupling.

FIG. 5 shows in greater detail the activation (transistor symbol 7) of coils 1 shown in FIG. 3, which form a route section. It should be observed that only those components are drawn in that are absolutely necessary for the understanding of the circuit. The modular units designated by n, n+1 and n+2 repeat in correspondence to the coils to be activated along the route. Half bridge 33, shown in FIG. 4, may be recognized, having its supply voltage 29/30, and one may also recognize coil 1, connected to ground 31, that is required for generating the propulsion field. Energy transmitting interface 3, made up, among other things, of coil 1 and coil 34 situated on the secondary part are also shown. Coil 34 has two connections 37. At the contact point of the two transistors of a half bridge 33, a capacitor 35 is additionally drawn in, and this is connected to an HF voltage source 36.

For an understanding of the energy transmission, reference numerals 35, 1, 34 and 37 are relevant. If one examines a module, for instance, module n+1, this functions as follows: The propulsion of a secondary part takes place as was thoroughly described in FIG. 4. Via supply line 36, a higher frequency supply voltage (or a supply voltage that is variable in frequency) is coupled in via capacitor 35, whose field is superposed with the field of the driving supply voltage. Coil 34, that rides along with the secondary part, in the ideal case, completely picks off again the power fed in via capacitor 35, and, at connection 37, it makes available the voltage required for the energy supply of modules that ride along and are mounted on the secondary part. Various voltage levels, designed specially for the consumers, could now be generated to connection 37 via AC/DC converters, as was described above in a most detailed manner above.

What is claimed is:

1. A linear motor for a modular transportation device, comprising:
    at least one primary part having a plurality of field-generating coils that are mounted side-by-side along a predetermined route;
    at least one secondary part, wherein the plurality of field-generating coils of the at least one primary part provides a propulsion field for propulsion of the at least one secondary part, and wherein the at least one secondary part is configured to support at least one consumer positioned on the at least one secondary part;
    an energy transmitting interface interposed between the at least one primary part and the at least one secondary part;
    a set-point interface;
    a coil drive circuit that is stationary with respect to the at least one primary part; and
    a support unit for providing rigid support of the at least one secondary part, wherein the support unit guides the at least one secondary part along the predetermined route;
    wherein an energy supply field having a higher frequency than a frequency of the propulsion field is superposed on the propulsion field,
    wherein the energy supply field is inductively coupled via the energy transmitting interface and supplies energy to at least one AC/DC converter provided on the at least one secondary part,
    wherein the at least one AC/DC converter is connected to the energy transmitting interface and supplies the at least one consumer positioned on the at least one secondary part,
    wherein the at least one consumer is connected to the AC/DC converter via a DC/DC converter,
    wherein the at least one secondary part includes at least a permanent magnet and a signal-processing device having one of a propulsion controller and a motion controller,
    wherein the one of the propulsion controller and the motion controller generates at least one set-point value relevant to coil control,
    wherein the at least one set-point value is supplied via the set-point interface from the at least one secondary part to the coil drive circuit as the quantity used for commutation, and
    wherein the linear motor is configured to be driven in one of a mono-phase and multi-phase manner.

2. The linear motor as recited in claim 1, wherein the at least one consumer is configured to execute a procedure required for an application process, wherein the application process is not drive-relevant, and wherein the at least one consumer is an apparatus relevant to the application process.

3. The linear motor as recited in claim 1, wherein at least one AC/AC converter is provided on the at least one secondary part, wherein the at least one AC/AC converter is connected to the energy transmitting interface and supplies the at least one consumer, and wherein the at least one consumer is connected to the AC/AC converter via an AC/DC converter.

4. The linear motor as recited in claim 1, wherein the plurality of field-generating coils generate the energy supply field, and wherein the energy supply field lies substantially opposite to the at least one secondary part.

5. The linear motor as recited in claim 1, wherein the plurality of field-generating coils generate the energy supply field, and wherein the energy supply field lies substantially opposite to the energy transmitting interface.

6. The linear motor as recited in claim 5, wherein the plurality of field-generating coils supply energy in response to an initialization of the at least one secondary part.

7. The linear motor as recited in claim 6, further comprising:
    at least one of buffered accumulators, batteries, and solar cells provided to ensure supply of required energy via the energy transmitting interface during normal operation.

8. An industrial machine system configured to implement an automation path for an industrial process that includes a linear motion, comprising:
    a linear motor arrangement which executes the linear motion, wherein the linear motor is driven in one of a mono-phase and multi-phase manner with motion control, and wherein the linear motor arrangement includes:
        at least one primary part having a plurality of field-generating coils in a winding arrangement along a predetermined route;
        at least one secondary part, wherein the plurality of field-generating coils of the at least one primary part provides a propulsion field for propulsion of the at least one secondary part, and wherein the at least one secondary part is configured to support at least one consumer positioned on the at least one secondary part;
        an energy transmitting interface interposed between the at least one primary part and the at least one secondary part;

a set-point interface;

a coil drive circuit that is stationary with respect to the at least one primary part; and a support unit for providing rigid support of the at least one secondary part;

wherein an energy supply field having a higher frequency than a frequency of the propulsion field is superposed on the propulsion field, and wherein the energy supply field is inductively decoupled via the energy transmitting interface and supplies energy to the at least one consumer positioned on the at least one secondary part, wherein the support unit guides the at least one secondary part along the predetermined route, wherein the at least one secondary part includes at least a permanent magnet and a signal-processing device having one of a propulsion controller and a motion controller, wherein the one of the propulsion controller and the motion controller generates at least one set-point value relevant to coil control, and wherein the at least one set-point value is supplied via the set-point interface from the at least one secondary part to the coil drive circuit as the quantity used for commutation.

9. The industrial machine system as recited in claim 8, wherein the field-generating coils that are mounted side-by-side along the predetermined route, wherein the energy supply field is inductively coupled via the energy transmitting interface and supplies energy to at least one AC/DC converter provided on the at least one secondary part, wherein the at least one AC/DC converter is connected to the energy transmitting interface and supplies the at least one consumer positioned on the at least one secondary part, and wherein the at least one consumer is connected to the AC/DC converter via a DC/DC converter.

10. The linear motor as recited in claim 8, wherein at least one AC/AC converter is provided on the at least one secondary part, wherein the at least one AC/AC converter is connected to the energy transmitting interface and supplies the at least one consumer, and wherein the at least one consumer is connected to the AC/AC converter via an AC/DC converter.

11. The linear motor as recited in claim 8, wherein the plurality of field-generating coils generate the energy supply field, and wherein the energy supply field lies substantially opposite to the at least one secondary part.

12. The linear motor as recited in claim 8, further comprising:

at least one of buffered accumulators, batteries, and solar cells to ensure supply of required energy via the energy transmitting interface during normal operation;

wherein the plurality of field-generating coils generate the energy supply field, wherein the energy supply field lies substantially opposite to the energy transmitting interface, and wherein the plurality of field-generating coils supply energy in response to an initialization of the at least one secondary part.

* * * * *